(12) United States Patent
Kazato (10) Patent No.: US 11,522,902 B2
(45) Date of Patent: Dec. 6, 2022

(54) RELIABILITY CALCULATION APPARATUS, RELIABILITY CALCULATION METHOD AND PROGRAM

(71) Applicant: Nippon Telegraph and Telephone Corporation, Tokyo (JP)

(72) Inventor: Yuta Kazato, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 98 days.

(21) Appl. No.: 17/055,892

(22) PCT Filed: May 13, 2019

(86) PCT No.: PCT/JP2019/018937
§ 371 (c)(1),
(2) Date: Nov. 16, 2020

(87) PCT Pub. No.: WO2019/225381
PCT Pub. Date: Nov. 28, 2019

(65) Prior Publication Data
US 2021/0203686 A1    Jul. 1, 2021

(30) Foreign Application Priority Data
May 23, 2018   (JP) .............................. JP2018-098709

(51) Int. Cl.
*H04L 9/40*    (2022.01)
*G06N 7/00*    (2006.01)

(52) U.S. Cl.
CPC ......... *H04L 63/1433* (2013.01); *G06N 7/005* (2013.01); *H04L 63/1408* (2013.01); *H04L 63/1441* (2013.01)

(58) Field of Classification Search
CPC .. H04L 63/1433; H04L 63/1408; G06N 7/005
See application file for complete search history.

(56) References Cited

U.S. PATENT DOCUMENTS 9,635,049 B1 *   4/2017   Oprea ................... H04L 63/145
10,958,667 B1 *  3/2021   Maida ................. H04L 63/1416
(Continued)

OTHER PUBLICATIONS

Asai et al., "Detecting Malicious Domains through DNS Graph Analysis," Information Processing Society of Japan, 2017, 2017(3):1-6, 14 pages (with English Translation).
(Continued)

*Primary Examiner* — Ali S Abyaneh
(74) *Attorney, Agent, or Firm* — Fish & Richardson P.C.

(57) ABSTRACT

A level-of-confidence calculation apparatus includes a first collecting unit that collects relevant information related to first threat intelligence that is input; a second collecting unit that collects, from a memory unit storing threat intelligence to which a level of confidence is appended, second threat intelligence related to the relevant information; a generation unit that generates a graph in which the first threat intelligence, the relevant information, and the second threat intelligence are set as nodes and the nodes relating to related information are connected; and a calculating unit that calculates, by applying a belief propagation method to the graph, a level of confidence of the first threat intelligence based on a level of confidence of the second threat intelligence, and therefore a level of confidence of threat intelligence with uncertain level of confidence can be calculated.

9 Claims, 5 Drawing Sheets

(56) References Cited

U.S. PATENT DOCUMENTS

| | | | | |
|---|---|---|---|---|
| 2014/0007238 A1* | 1/2014 | Magee | ................... | G06F 21/577 |
| | | | | 726/24 |
| 2015/0215334 A1* | 7/2015 | Bingham | ............ | H04L 63/1425 |
| | | | | 726/23 |
| 2017/0041333 A1* | 2/2017 | Mahjoub | ................ | G06F 16/951 |
| 2018/0159876 A1* | 6/2018 | Park | .................... | H04L 63/1425 |
| 2018/0198827 A1* | 7/2018 | Eifler | ....................... | G06F 21/57 |
| 2018/0343272 A1 | 11/2018 | Khalil et al. | | |
| 2019/0334942 A1* | 10/2019 | Wicker | ................... | G06F 16/23 |

OTHER PUBLICATIONS

Kazato et al., "Graph Analysis on DNS Graph and Malignant Domain Identification by Threat Score Propagation," Computer Software, 2016, 33(3):16-28, 31 pages (with English Translation).

Li et al., "MTIV: A Trustworthiness Determination Approach for Threat Intelligence," International Conference on Security, Privacy and Anonymity in Computation, Communication and Storage (SpaCCS) 2017 Workshops, LNCS 10658, 2017, pp. 5-14.

* cited by examiner

RELIABILITY CALCULATION APPARATUS, RELIABILITY CALCULATION METHOD AND PROGRAM

CROSS-REFERENCE TO RELATED APPLICATIONS

This application is a National Stage application under 35 U.S.C. § 371 of International Application No. PCT/JP2019/018937, having an International Filing Date of May 13, 2019, which claims priority to Japanese Application Serial No. 2018-098709, filed on May 23, 2018. The disclosure of the prior application is considered part of the disclosure of this application, and is incorporated in its entirety into this application.

TECHNICAL FIELD

The present invention relates to a level-of-confidence calculation apparatus, a level-of-confidence calculation method, and a program.

BACKGROUND ART

Threat intelligence (Cyber Threat Intelligence) includes information associated with a cyberattack and a threat such as an attacker, an attack target, an attack method, and information for detecting an attack that has occurred, which are necessary for detection and response of the cyberattack. For example, examples of threat intelligence include blacklist information of IP addresses and domain names used by attackers, information of attackers, information relating to countermeasure against attack, and the like. Such threat intelligence is distributed together with abundant relevant information and includes information of contributors or providers, update frequencies (registration, addition, and modification of information), description, relations between (communication and flow of) IP addresses/domain names related to a series of attacks, and the like.

In security operations in which cyberattacks are detected and handled, one of important actions is to determine the authenticity of maliciousness of acquired threat intelligence and make decisions. In particular, in order to calculate a level of confidence for helping determine the authenticity of maliciousness of threat intelligence, analysts and operators repeat a process of hypothesis verification through data analysis and information collection, thereby calculating a level of confidence of the threat intelligence. Thus, early decision-making is possible with threat intelligence having a high level of confidence.

Note that a level of confidence is a probabilistic representation of likelihood that maliciousness of threat intelligence is true and can be expressed by a relationship of $0 \leq P(x) \leq 1$. For example, threat intelligence with high likelihood that the maliciousness of the threat intelligence is true is threat intelligence with $P(x)$ close to 1, and threat intelligence with high likelihood that the maliciousness of the threat intelligence is false is threat intelligence with $P(x)$ close to 0.

In the detection of attacking communication and the extraction of threat intelligence on a network, there are signature-type and machine-learning-type attack detection apparatuses as primary attack detection methods.

Although such signature-type attack detection apparatuses are effective for known attacks because the apparatuses detect attacks based on pattern matching with signature rules, the apparatuses are said to be unsuitable for the detection of attacks of subtypes and unknown attacks.

On the other hand, machine-learning-type attack detection apparatuses learn characteristics of the traffic of the attacking communication or normal communication and detect attacks based on the characteristics and behaviors of the communication. Thus, although machine-learning-type attack detection apparatuses can detect unknown attacks and can detect attacks sooner, in threat intelligence extracted from the network by behavior detection, only a relation between IP addresses and domain names is obtained, thus the authenticity of an IP address and a domain name that are suspected to be malicious is ambiguous (having uncertain level of confidence), and the relevant information is not obtained.

In the related art, there are techniques for calculating a threat score and a level of confidence of threat intelligence for which it is difficult to ascertain whether there is authentic maliciousness (having uncertain level of confidence).

In Non Patent Literature 1, a relation between an IP address and a domain name based on a Domain Name System (DNS) name resolution result and a confirmed level of confidence of a part of them are provided, and for the IP address/domain name for which authenticity is unknown, a level of confidence of threat intelligence is calculated using a belief propagation method based on their relations in a graph.

In Non Patent Literature 2, threat intelligence and its relevant information are provided, a feature value of a level of confidence is generated from the abundant relevant information, and a level of confidence of the threat intelligence is calculated using a machine learning technique (DBN).

CITATION LIST

Non Patent Literature

Non Patent Literature 1: "Specification of Malicious Domain using Graph Analysis and Threat Score Propagation on DNS Graph" Yuta Kazato, Kensuke Fukuda, and Toshiharu Sugawara, Computer Software 33.3 (2016): 3_16-3_28.

Non Patent Literature 2: Li, Lei, Xiaoyong Li, and Yali Gao "MTIV: A Trustworthiness Determination Approach for Threat Intelligence," International Conference on Security, Privacy and Anonymity in Computation, Communication and Storage. Springer, Chain, 2017.

SUMMARY OF THE INVENTION

Technical Problem

However, in Non Patent Literature 1 and Non Patent Literature 2, threat intelligence with uncertain level of confidence that is extracted by behavior detection of a network, for example, information only of the relation between the IP address and the domain name, does not include the relevant information that is assumed to be given in the above-described documents, and thus it is difficult to determine authenticity of maliciousness.

The present invention has been made in view of the above-described circumstances and aims to enable calculation of a level of confidence of threat intelligence with uncertain level of confidence.

Means for Solving the Problem

In order to solve the above-described problem, a level-of-confidence calculation apparatus includes a first collecting unit configured to collect relevant information related to first threat intelligence that is input, a second collecting unit configured to collect, from a memory unit configured to store threat intelligence to which a level of confidence is appended, second threat intelligence related to the relevant information, a generation unit configured to generate a graph in which the first threat intelligence, the relevant information, and the second threat intelligence are set as nodes and the nodes relating to related information are connected, and a calculating unit configured to calculate, by applying a belief propagation method to the graph, a level of confidence of the first threat intelligence based on a level of confidence of the second threat intelligence.

Effects of the Invention

A level of confidence of threat intelligence with uncertain level of confidence can be calculated.

DESCRIPTION OF EMBODIMENTS

Figure 1:
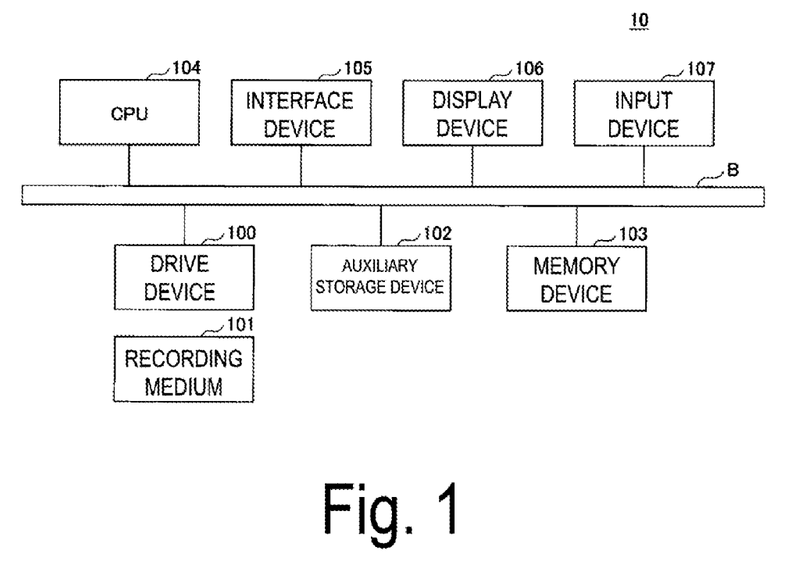
FIG. 1 is a diagram illustrating an example of a hardware configuration of a level-of-confidence calculation apparatus 10 according to an embodiment of the present invention.

Hereinafter, embodiments of the present invention will be described with reference to the drawings. FIG. 1 is a diagram illustrating an example of a hardware configuration of a level-of-confidence calculation apparatus 10 according to an embodiment of the present invention. The level-of-confidence calculation apparatus 10 in FIG. 1 includes a drive device 100, an auxiliary storage device 102, a memory device 103, a CPU 104, an interface device 105, a display device 106, and an input device 107, and the like that are connected to each other via a bus B.

A program for realizing processing in the level-of-confidence calculation apparatus 10 is provided by a recording medium 101 such as a CD-ROM. If the recording medium 101 storing the program is set in the drive device 100, the program is installed in the auxiliary storage device 102 from the recording medium 101 via the drive device 100. However, the program is not necessarily installed from the recording medium 101 and may be downloaded from another computer via a network. The auxiliary storage device 102 stores the installed program and also stores required files, data, and the like.

The memory device 103 reads and stores the program from the auxiliary storage device 102 in a case in which a command for activating the program is issued. The CPU 104 realizes a function related to the level-of-confidence calculation apparatus 10 according to the program stored in the memory device 103. The interface device 105 is used as an interface for establishing connection to a network. The display device 106 displays a Graphical User Interface (GUI) or the like based on the program. The input device 107 includes a keyboard, a mouse, and the like, and is used to allow inputs of various operation commands.

Figure 2:
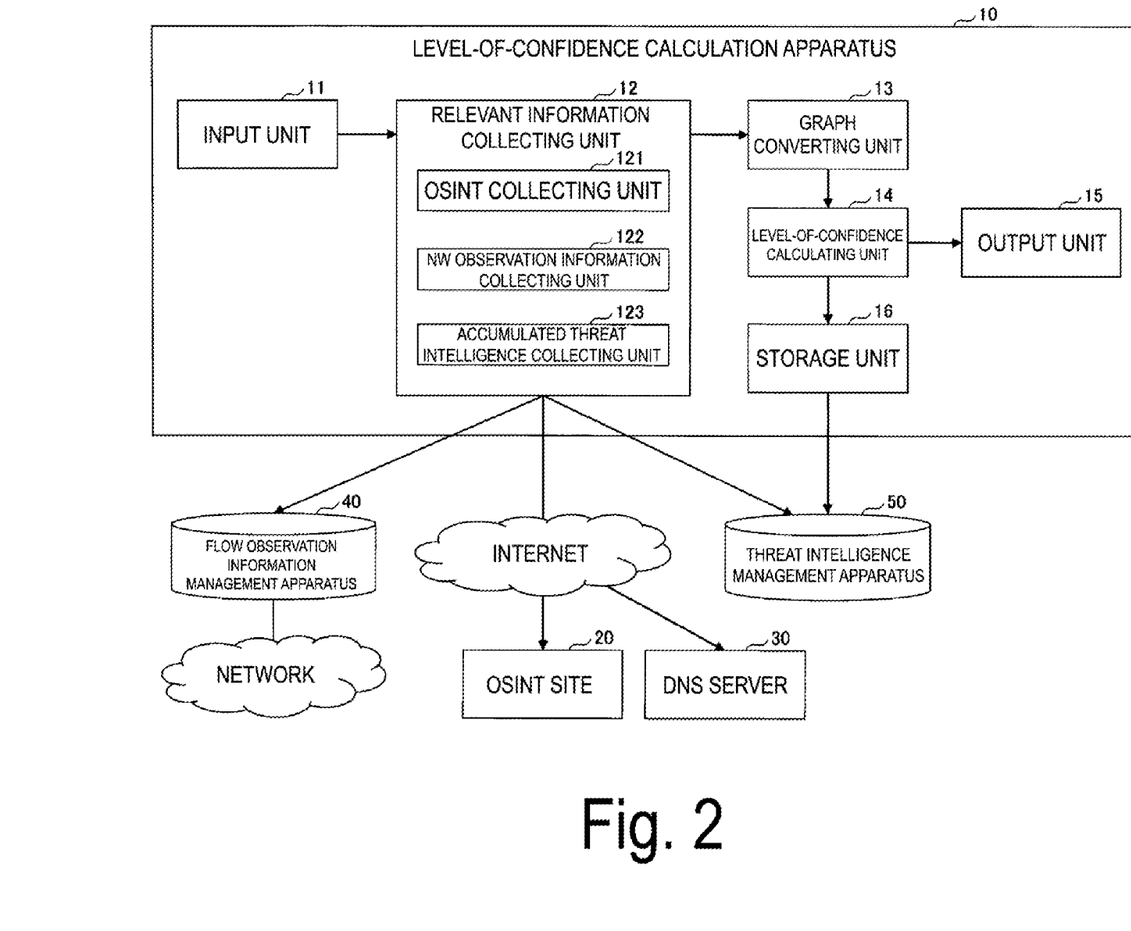
FIG. 2 is a diagram illustrating an example of a functional configuration of the level-of-confidence calculation apparatus 10 according to an embodiment of the present invention.

FIG. 2 is a diagram illustrating an example of a functional configuration of the level-of-confidence calculation apparatus 10 according to an embodiment of the present invention. In FIG. 2, the level-of-confidence calculation apparatus 10 includes an input unit 11, a relevant information collecting unit 12, a graph converting unit 13, a level-of-confidence calculating unit 14, an output unit 15, a storage unit 16, and the like. Each of these units is realized with processing that at least one program installed in the level-of-confidence calculation apparatus 10 causes the CPU 104 to perform.

The input unit 11 inputs threat intelligence with uncertain level of confidence (hereinafter referred to as "target threat intelligence") as a subject of level-of-confidence calculation. The target threat intelligence does not include relevant information. In addition, the target threat intelligence is a value that does not exist as past threat intelligence. Note that a level of confidence is a probabilistic representation of likelihood that maliciousness of threat intelligence is true and can be expressed by a relationship of $0 \leq P(x) \leq 1$. For example, threat intelligence with high likelihood that the maliciousness of the threat intelligence is true is threat intelligence with $P(x)$ close to 1, and threat intelligence with high likelihood that the maliciousness of the threat intelligence is false is threat intelligence with $P(x)$ close to 0.

The relevant information collecting unit 12 retrieves and collects information related to the target threat intelligence (relevant information) for a value constituting the target threat intelligence (an IP address, a domain name, and the like), and temporarily records the collected result. In FIG. 2, the relevant information collecting unit 12 includes an OSINT collecting unit 121, a NW observation information collecting unit 122, and an accumulated threat intelligence collecting unit 123.

The OSINT collecting unit 121 queries public information such as open source intelligence (OSINT) or the like in an OSINT site 20 and the like to collect relevant information.

The NW observation information collecting unit 122 collects information observable on the network as relevant information. For example, the NW observation information collecting unit 122 makes a query to a DNS server 30 that performs DNS name resolution and a flow observation information management apparatus 40 that stores flow information collected on the network (flow information observed and collected by a flow exporter and a flow collector present on the network) and thereby collects relevant information.

The accumulated threat intelligence collecting unit 123 makes a query to a threat intelligence management apparatus 50 that accumulates (stores) and manages threat intelligence that has been previously used, registered or shared (hereinafter referred to as "accumulated threat intelligence") to collect corresponding accumulated threat intelligence as relevant information. The accumulated threat intelligence is, for example, domain names, IP addresses, file hash values of malware, and the like, given a level of confidence of maliciousness, and information related to the accumulated threat intelligence is also present.

The graph converting unit 13 converts the target threat intelligence and each piece of the collected relevant information into a graph structure represented by nodes and links. At this time, the nodes store the value of the threat intelligence or the value of the collected relevant information, and the links connects related nodes.

The level-of-confidence calculating unit 14 uses a belief propagation method to propagate a level of confidence to the nodes from the accumulated threat intelligence, and thus calculates a level of confidence of the target threat intelligence.

The output unit 15 outputs the calculation result of the level of confidence of the target threat intelligence and the collected relevant information. A form of the output is not limited to a predetermined form. The result and the information may be displayed on the display device 106, may be stored in the auxiliary storage device 102, or may be transferred via a network.

The storage unit 16 stores information including the target threat intelligence, the collected relevant information, and the calculated level of confidence as new threat intelligence in the threat intelligence management apparatus 50.

Note that, in FIG. 2, the threat intelligence management apparatus 50 is a computer with a database that accumulates and manages threat intelligence that has been used or shared in the past.

The flow observation information management apparatus 40 is a computer with a database that stores and manages flow information of a network collected from a flow exporter and a flow collector present on the network.

The OSINT site 20 is a website or a service of open source intelligence that is primarily published on the Internet. For example, examples of the OSINT site 20 include a WHOIS retrieval service that provides owner information of IP addresses and domain names, a retrieval site for an Autonomous System (AS) number, a GeoIP retrieval site, a reputation site (VirusTotal, and the like), and the like.

The DNS server 30 is a device that manages association of domain names with IP addresses, and mainly receives requests for conversion from domain names to IP addresses, and reverse requests.

Figure 3:
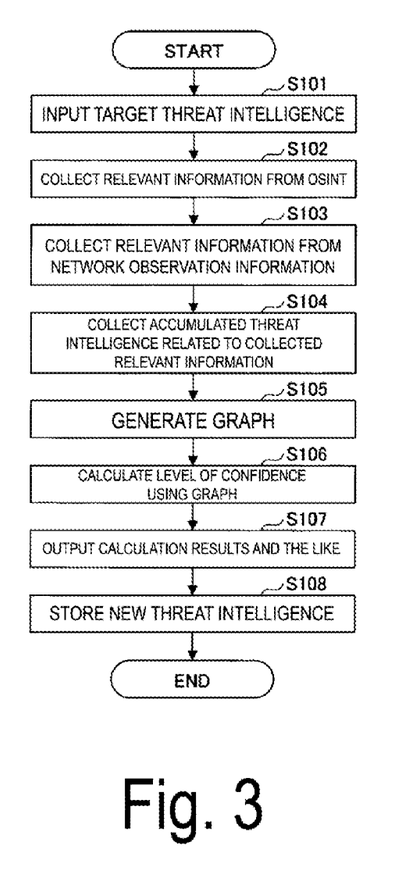
FIG. 3 is a flowchart for describing an example of a processing procedure performed by the level-of-confidence calculation apparatus 10.

A processing procedure performed by the level-of-confidence calculation apparatus 10 will be described below. FIG. 3 is a flowchart for describing an example of a processing procedure performed by the level-of-confidence calculation apparatus 10.

In step S101, the input unit 11 inputs target threat intelligence. The target threat intelligence may be input via the input device 107 or received via a network. Note that the target threat intelligence includes, for example, an IP address or a domain name, both an IP address and a domain name, or the like as a value.

Subsequently, the OSINT collecting unit 121 retrieves WHOIS registration information, an AS number, GeoIP information (such as the country name, the city name, the Internet Service Provider (ISP) name, and the like) related to values of the target threat intelligence from the OSINT site 20, and collects the retrieved information as relevant information to the target threat intelligence (S102). For example, in the retrieval of WHOIS registration information, the owner information and registered person information of the IP address or the domain name of the target threat intelligence can be acquired, and in the retrieval of AS number, the AS number to which the IP address of the target threat intelligence belongs can be acquired. Note that, in a case in which the target threat intelligence includes multiple values (e.g., IP address and domain name), relevant information is collected for each of the values.

Subsequently, the NW observation information collecting unit 122 retrieves flow observation information related to the target threat intelligence from the flow observation information management apparatus 40 and retrieves DNS name resolution results related to the target threat intelligence from the DNS server 30, and collects the retrieved information (the flow observation information and the DNS name resolution results) as relevant information for the target threat intelligence (S103). Note that the flow observation information refers to information including statistical information for a set of a transmission source and a destination. The flow observation information related to the target threat intelligence refers to flow observation information including a value of the target threat intelligence (such as an IP address or a domain name), at least one of a transmission source and a destination in a transmission source, a destination, or the like. In addition, the DNS name resolution result for the target threat intelligence is an IP address in a case in which a value of the target threat intelligence is a domain name, and a domain name (result of reverse DNS resolution) in a case in which a value of the target threat intelligence is an IP address.

Subsequently, the accumulated threat intelligence collecting unit 123 makes a query to the threat intelligence management apparatus 50 regarding accumulated threat intelligence associated with the relevant information collected in step S102 or S103 to collect the corresponding accumulated threat intelligence as relevant information (S104). The accumulated threat intelligence associated with the relevant information refers to accumulated threat intelligence including the relevant information as a value. In this case, the corresponding relevant information is set in units of each value (each parameter). For example, in a case of flow observation information, a source address and a destination address are treated as individual pieces of relevant information, respectively. The same applies to other relevant information.

Next, the graph converting unit 13 sets the target threat intelligence and each piece of the collected relevant information as nodes and generates a graph in which relevant nodes are connected by links (S105). Each of the nodes stores a value of the corresponding target threat intelligence or a value of the relevant information.

Figure 4:
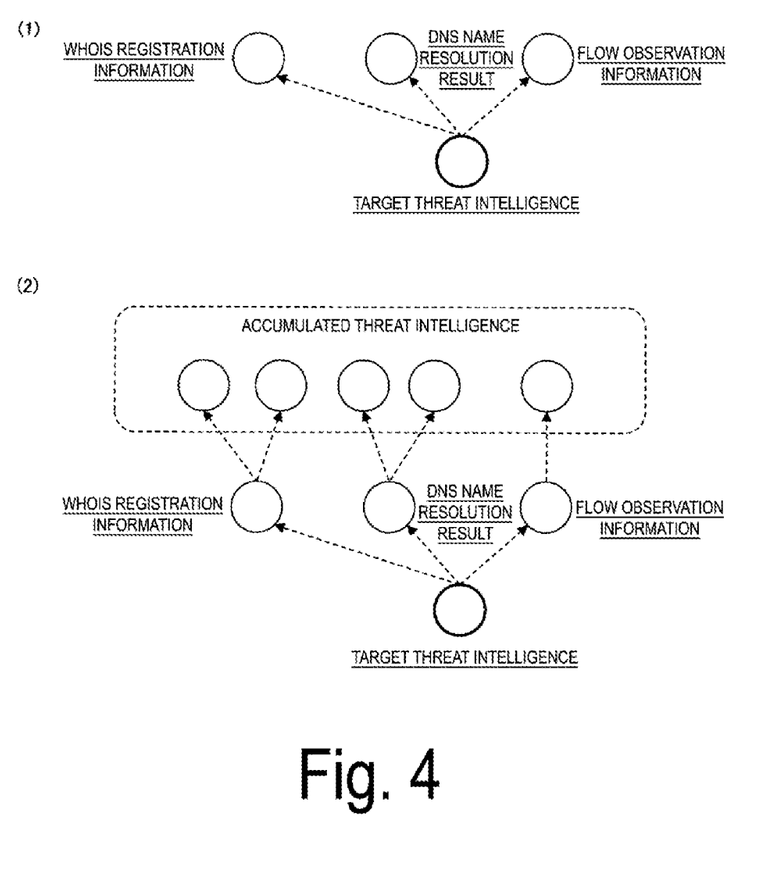
FIG. 4 is a diagram illustrating an example of a graph based on target threat intelligence and collected relevant information.

FIG. 4 is a diagram illustrating an example of a graph based on target threat intelligence and collected relevant information. FIG. 4(1) illustrates nodes corresponding to target threat intelligence and nodes corresponding to relevant information collected based on the target threat intelligence (i.e., each piece of relevant information other than accumulated threat intelligence) being connected by links. That is, FIG. 4(1) corresponds to an example in which WHOIS registration information, a DNS name resolution result, and flow observation information have been collected from the target threat intelligence one at a time.

Further, FIG. 4(2) illustrates nodes corresponding to each piece of the relevant information of FIG. 4(1) and nodes corresponding to accumulated threat intelligence collected based on each piece of the relevant information being connected by links, thereby completing a graph. That is, FIG. 4(2) corresponds to an example in which two pieces of the accumulated threat intelligence have been collected from the WHOIS registration information and the DNS name resolution result, respectively, and one piece of the accumulated threat intelligence has been collected from the flow observation information.

Note that a node in the graph is disposed for each value of the target threat intelligence or the relevant information. In addition, the directions of the arrows in the graph indicate the direction of relations. That is, based on the origin of the arrows, it indicates that the heads of the arrow have been retrieved (collected).

Subsequently, the level-of-confidence calculating unit 14 applies the belief propagation method which is a graph analysis method to the graph generated in step S105 and calculates the level of confidence P(x) of the target threat intelligence by propagating the levels of confidence given to the nodes of the accumulated threat intelligence among the nodes (S106). Here, an example of a propagation equation for level of confidence propagation in level-of-confidence calculation is as follows.

$$P(x)=\Sigma\{1/(t-t0)\}wP$$

w: Weight of each information source
t: Current time
t0: Registration time of the accumulated threat intelligence
P: Level of confidence of each node of the accumulated threat intelligence with links
However, when t=t0, t−t0=1.
Here, the value of w is 0 or greater and less than 1 and is freely selected by the user.

Figure 5:
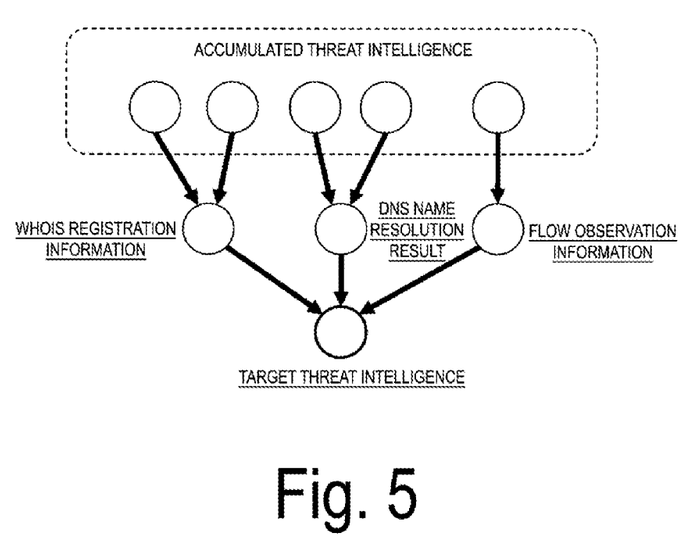
FIG. 5 is a diagram for describing calculation of a level of confidence.

FIG. 5 is a diagram for describing calculation of a level of confidence. In FIG. 5, the bold arrows indicate the propagation of levels of confidence. Note that the propagation of levels of confidence is described in Non Patent Literature 1. In the calculation of a level of confidence, the calculation is performed until the level of confidence P(x) of the object threat intelligence converges, so it is possible to propagate and utilize the levels of confidence of the entire graph consisting of the target threat intelligence and the relevant information. Furthermore, by placing the reciprocal of the time difference (1/(t−t0)) in the propagation equation of the level of confidence, influence of the level of confidence of relatively old accumulated threat intelligence (influence on the level of confidence of the target threat intelligence) can be reduced.

Subsequently, the output unit 15 outputs the calculation result of the level of confidence of the target threat intelligence and the collected relevant information (S107).

Next, the storage unit 16 stores information including the target threat intelligence and the collected relevant information and having the calculated level of confidence as new threat intelligence in the threat intelligence management apparatus 50 (S108).

As described above, according to the present embodiment, a level of confidence of threat intelligence with uncertain level of confidence can be calculated. In particular, for calculation of a level of confidence of threat intelligence with uncertain level of confidence, a graph structures can be generated based on relevant information collected from multiple information sources, and propagation of levels of confidence in the graph analysis method can be used to increase the accuracy and efficiency in calculation of a level of confidence. As a result, it is possible to detect and respond to cyberattacks earlier, more accurately, and with greater comprehensiveness.

In addition, accumulation of target threat intelligence for which levels of confidence have been calculated along with its relevant information and levels of confidence enables accumulated threat intelligence to be expanded.

Further, collecting of network observation information and OSINT information related to target threat intelligence enables association with accumulated threat intelligence accumulated from the past and calculation of highly accurate levels of confidence.

In addition, the collection and expansion of relevant information and calculation of the level of confidence can bring a reduction in a burden on operators required for sorting a large number of pieces of threat intelligence and a reduction of false detection, thereby enabling efficient security operations.

Note that, in the present embodiment, the OSINT collecting unit 121 and the NW observation information collecting unit 122 are examples of the first collecting unit. The accumulated threat intelligence collecting unit 123 is an example of the second collecting unit. The graph converting unit 13 is an example of the generation unit. The level-of-confidence calculating unit 14 is an example of the calculating unit. The threat intelligence management apparatus 50 is an example of the memory unit. The target threat intelligence is an example of the first threat intelligence. The accumulated threat intelligence is an example of the second threat intelligence.

While preferred embodiments of the present invention have been described above, the present invention is not limited to a specific embodiment and can be subjected to vanous modifications and changes within the scope of the gist of the present invention disclosed in the claims.

REFERENCE SIGNS LIST

10 LEVEL-OF-CONFIDENCE CALCULATION APPARATUS
11 INPUT UNIT
12 RELEVANT INFORMATION COLLECTING UNIT
13 GRAPH CONVERTING UNIT
14 LEVEL-OF-CONFIDENCE CALCULATING UNIT
15 OUTPUT UNIT
16 STORAGE UNIT
20 OSINT SITE
30 DNS SERVER
40 FLOW OBSERVATION INFORMATION MANAGEMENT APPARATUS
50 THREAT INTELLIGENCE MANAGEMENT APPARATUS
100 DRIVE DEVICE
101 RECORDING MEDIUM
102 AUXILIARY STORAGE DEVICE
103 MEMORY DEVICE
104 CPU
105 INTERFACE DEVICE
106 DISPLAY DEVICE
107 INPUT DEVICE
121 OSINT COLLECTING UNIT
122 NW OBSERVATION INFORMATION COLLECTING UNIT
123 ACCUMULATED THREAT INTELLIGENCE COLLECTING UNIT
B BUS

The invention claimed is:

1. A level-of-confidence calculation apparatus comprising:
a first collecting circuitry configured to collect relevant information related to first threat intelligence that is input;
a second collecting circuitry configured to collect, from a memory configured to store threat intelligence to which a level of confidence is appended, second threat intelligence related to the relevant information;
a generation circuitry configured to generate a graph in which the first threat intelligence, the relevant information, and the second threat intelligence are set as nodes, each of the nodes connected to another node including related information; and
a calculating circuitry configured to calculate, by applying a belief propagation method to the graph, a level of confidence of the first threat intelligence based on a level of confidence of the second threat intelligence.

2. The level-of-confidence calculation apparatus according to claim 1, further comprising:
a storage configured to store, in the memory, the first threat intelligence to which the level of confidence of the first threat intelligence calculated by the calculating circuitry is appended.

3. The level-of-confidence calculation apparatus according to claim 1,
wherein the calculating circuitry is configured to calculate the level of confidence of the threat intelligence such that influence of the level of confidence of the second threat intelligence that is relatively old is reduced.

4. The level-of-confidence calculation apparatus according to claim 1,
wherein the relevant information includes open source intelligence or network observation information.

5. A method for calculating a level of confidence, performed by a computer, the method comprising:
collecting relevant information related to first threat intelligence that is input;
collecting, from a memory configured to store threat intelligence to which a level of confidence is appended, second threat intelligence related to the relevant information;
generating a graph in which the first threat intelligence, the relevant information, and the second threat intelligence are set as nodes, each of the nodes connected to another node including related information; and
calculating, by applying a belief propagation method to the graph, a level of confidence of the first threat intelligence based on a level of confidence of the second threat intelligence.

6. A recording medium storing a program, wherein execution of the program causes one or more computers to perform operations comprising:
collecting relevant information related to first threat intelligence that is input;
collecting, from a memory configured to store threat intelligence to which a level of confidence is appended, second threat intelligence related to the relevant information;
generating a graph in which the first threat intelligence, the relevant information, and the second threat intelligence are set as nodes, each of the nodes connected to another node including related information; and
calculating, by applying a belief propagation method to the graph, a level of confidence of the first threat intelligence based on a level of confidence of the second threat intelligence.

7. The recording medium according to claim 6, wherein the operations further comprise:
storing, in the memory, the first threat intelligence to which the level of confidence of the calculated first threat intelligence is appended.

8. The recording medium according to claim 6, wherein the operations further comprise:
calculating the level of confidence of the threat intelligence such that influence of the level of confidence of the second threat intelligence that is relatively old is reduced.

9. The recording medium according to claim 6,
wherein the relevant information includes open source intelligence or network observation information.

* * * * *